June 24, 1930.  E. P. BAIRD  1,767,643

LOCK

Filed April 19, 1926

Inventor
Edward P. Baird
By Fred Gerlach Atty.

Patented June 24, 1930

1,767,643

UNITED STATES PATENT OFFICE

EDWARD PAYSON BAIRD, OF EVANSTON, ILLINOIS

LOCK

Application filed April 19, 1926. Serial No. 102,873.

The invention relates to locking devices and more particularly to those devices which are adapted to prevent removal of a threaded element from a retaining-bolt, such, for example, as those used on spare tire carriers for automobiles.

The object of the invention is to provide a device of this type which is of new and improved construction, is efficient in operation and may be produced at a low cost.

The invention consists in the several novel features hereinafter set forth and more particularly defined by the claims at the conclusion hereof.

Figure 1:
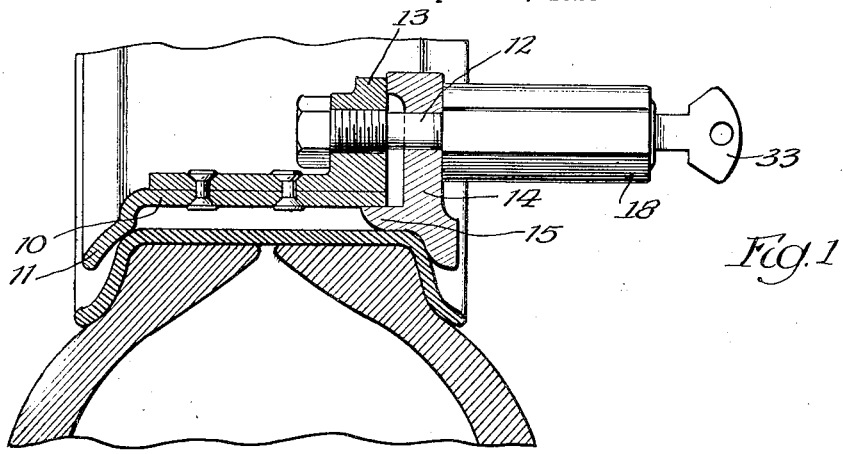
Figures 2, 3:
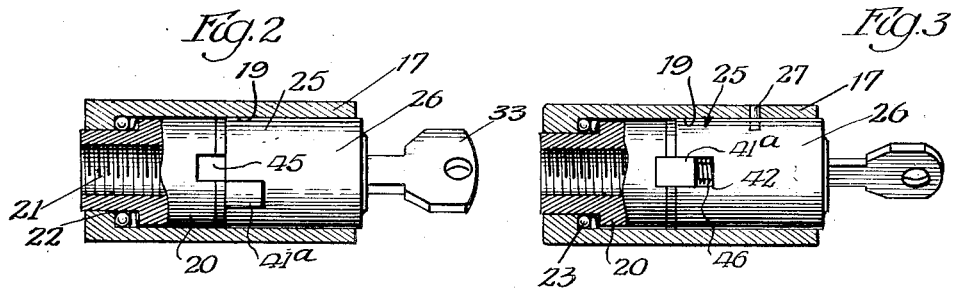
Figures 4, 5:
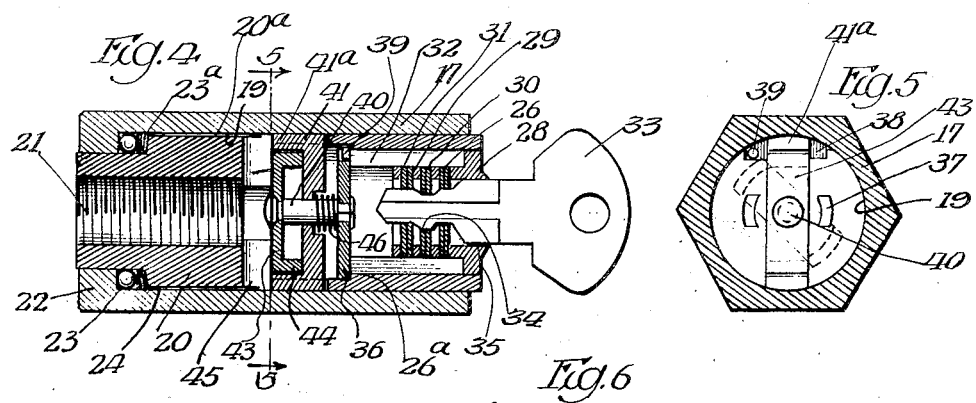
Figure 6:
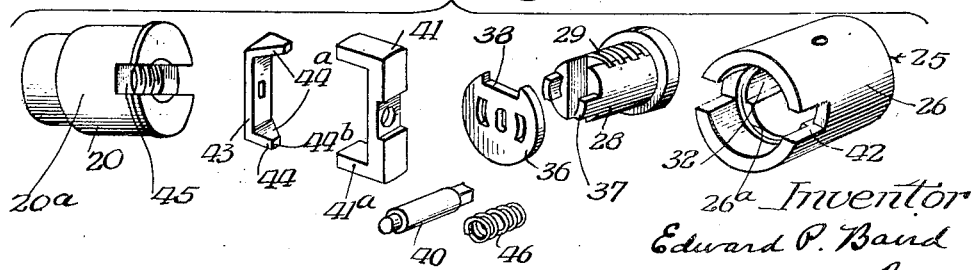

In the drawing: Fig. 1 is a view, partly in section and partly in elevation, of a spare tire carrier and a locking device embodying the invention applied thereto. Figs. 2 and 3 are views of the device, partly in section and partly in elevation, showing the threaded element or sleeve in its operative and inoperative positions. Fig. 4 is a longitudinal section of the device. Fig. 5 is a section taken on line 5—5 of Fig. 4. Fig. 6 is a detail perspective of the threaded element and the various parts of the lock and locking elements.

The invention is exemplified with a spare tire carrier which comprises a ring 10 having an annular outwardly extending flange 11 at its inner edge which forms a seat for supporting one of the tire retaining flanges of the rim of the spare tire; a horizontally and outwardly extending bolt 12 which is secured by a bracket 13 to the inner periphery of ring 10; and a lug 14 which is loosely mounted on the bolt and is provided with a flange 15 which forms a seat for supporting the other tire retaining flange of the rim, as well understood in the art.

The locking device which constitutes the present invention comprises a casing 17 which is provided with a polyhedral outer periphery 18 and a cylindrical inner periphery 19; a locking sleeve or element 20 which is rotatably mounted in one end of the casing and is adapted to be secured to the bolt 12 to jam the lug 14 into engagement with the tire rim; a cylinder lock 25 which is mounted in the other end of the casing and is held therein against relative rotation; and locking elements which are disposed between the sleeve 20 and the lock and which are operable by the latter to cause the sleeve to be secured for conjoint rotation with the casing.

Sleeve 20 is provided with a female screwthread 21 whereby it may be connected to the bolt 12 of the tire carrier, as shown in Fig. 1. When the locking elements are in their operative position (Fig. 3), sleeve 20 is held against rotation relatively to the casing and while in this position it may be applied to the bolt 12 by means of the manual rotation of the casing. By applying a wrench or any other suitable tool to the polyhedral surface of the casing, the sleeve may be rotated and jammed into engagement with the lug of the tire carrier so as to secure the latter against removal. While the sleeve is in this position, the cylinder lock 25 may be operated to shift the locking elements into their alternative or inoperative position, so as to release the locking sleeve 20 and thus cause the casing to be rotatable therearound. Thus rotation of the casing will not effect or move the sleeve from its position as lock nut, and the lug 14 and nut 16 of the tire carrier will be securely held against removal.

The outer end of the sleeve 20 is rotatably mounted in an annular flange 22 which is integrally formed on the inner end of the casing. A ball bearing is formed between the casing and the sleeve and comprises a plurality of balls 23 which are disposed between the inner face of flange 22 and a shoulder 24 which is formed on the central portion of the sleeve. This bearing acts as a thrust bearing and prevents the sleeve from being rotated, when it is in its operative position, by friction caused by distortion of the casing or by forcing the casing outwardly against shoulder 24. A spring washer 23[a] is interposed between the balls 23 and the shoulder 24 and presses the sleeve against the lock 25 to prevent rattling of the sleeve. The central portion of the sleeve is cut away as at 20[a] so that it will not engage the inner periphery 19 of the casing, and hence any rust which forms thereon will not retard the rotation of the casing.

The lock 25 comprises, a cylindrical housing 26 which is mounted in the outer end of the casing 17 and is rigidly secured therein by a pin 27 which extends through the casing and the housing; a cylinder 28 which is rotatably mounted in the housing 26 and is provided with transverse slideways or guides 29; and a plurality of transversely movable plate tumblers 30 which are provided with end tongues 31 which are adapted to enter a pair of longitudinally extending grooves 32 formed in the inner periphery of the housing 26 so as to normally secure the cylinder against rotation. Each tumbler 30 is provided with a slot 34 through which a key 33 is adapted to pass, the edges of the latter being adapted to cooperate with the ends of the slots 34 to position the tumblers so that the tongues 31 will be withdrawn from the grooves 32 in the casing and rotation of the cylinder is permitted, as well understood in the art. The front wall of the cylinder is provided with a slot 35 which is in alignment with the slots 34 of the tumblers and permits the insertion and withdrawal of key 33. A plate 36 is rigidly secured to the inner end of the cylinder 28 by a tongue and slot connection 37, and abuts against a shoulder 26$^a$ formed in the housing, so as to prevent longitudinal displacement of the cylinder. This plate is provided with a slot 38 which is adapted to cooperate with a longitudinally extending pin 39 mounted in the housing 26 to limit the rotation of the cylinder in the housing.

The locking elements for securing the sleeve 20 against rotation comprise, a stub shaft 40 which is riveted at one end to plate 36; a bolt member 41 which is provided at its ends with a pair of longitudinally extending lugs 41$^a$ which are slidably mounted in a pair of slots 42 formed on the inner end of housing 26; and a bar member 43 which is riveted to the outer end of shaft 40 and is provided with a pair of horizontally extending flanges 44 which extend toward bolt 41. The latter is slidably mounted on shaft 40, and the lugs thereon are adapted to enter a pair of slots 45 formed in the inner end of sleeve 20 so as to lock the latter against rotation. A spring 46 extends around shaft 40 between bolt member 41 and plate 36 and is adapted to normally shift the bolt member axially when the slots 45 are brought into registry with lugs 41, so that the latter will enter the slots and lock the sleeve for conjoint rotation with the casing. Flanges 44 are provided with cam surfaces 44$^a$ which, when the bar member is rotated by operation of the cylinder 28, are adapted to shift the bolt member axially away from sleeve 20 so that lugs 41 will be withdrawn from the slots 45 of the sleeve and the latter will be released so that the casing will rotate relatively thereto. Flat surfaces 44$^b$ are formed on the inner ends of the flanges 44 and are adapted to abut against the bolt member 41 to hold the latter in its shifted position (Fig. 4). Bolt member 41 is so disposed that it will be in its shifted position when the cylinder is in position for the insertion or removal of the key. Thus the sleeve 20 will at all times be in its released position, while the key is withdrawn.

The operation of the locking device will be as follows: When it is desired to apply the device to a tire carrier or other such article, key 33 will be inserted into cylinder 28 and turned so as to rotate the cylinder. During this rotation, flanges 44 will be rotated out of engagement with bolt member 41 and spring 46 will thereupon act to shift the bolt member axially and cause the lugs 41$^a$ to enter the slots 45 in sleeve 20, thereby securing the latter for conjoint rotation with the casing. While the parts of the device are in this position, sleeve 20 may be applied to the bolt 12 of the carrier by means of rotating casing 17. When the sleeve is brought adjacent the lug 14 of the carrier, a wrench may be applied to the polyhedral surfaces of the casing 17 and the latter rotated until the sleeve is securely jammed against the lug. Key 33 will then be turned in the opposite direction and withdrawn. This will cause bar member 43 to rotate the cam surfaces on the flanges 44 to shift the bolt member 41 axially away from sleeve 20, thereby causing the withdrawal of the lugs 41$^a$ from the slots 45 in the sleeve. In this position, sleeve 20 will be in its operative position and casing 17 will be rotatable therearound, so that rotation of the latter will not effect the sleeve, and the nut 16 and the lug 14 of the tire carrier will be secured against removal.

The invention exemplifies a locking device for a tire carrier which is of new and improved construction, and in which the parts thereof may be readily assembled so that the device may be produced at a low cost.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a locking device, the combination of a casing, a lock mounted in one end of the casing, an element mounted in the other end of the casing and provided with a screw-thread to receive a threaded part, the casing and said element being rotatable together and relatively to each other, a ball thrust bearing between the casing and the element to prevent rotation of the element by friction when the element and casing are rotatable relatively to each other, and means disposed between said element and lock and controlled by the lock, for locking the casing and element for conjoint rotation so that the element can be rotated by the casing, and for releasing the casing for independent rotation so that said element cannot be rotated thereby.

2. In a locking device, the combination of an elongated casing having a bore extending longitudinally and completely therethrough, a lock mounted in the bore adjacent one end of the casing, an element mounted in the bore adjacent the other end of the casing and provided with a screw-thread to receive a threaded part, said element having a notch formed therein at its inner end, means disposed in the bore between the element and lock, shiftable axially of the bore and into the notch, and controlled by the lock, for locking the casing and element for conjoint rotation so that the element can be rotated by the casing, and for releasing the casing for independent rotation so that said element cannot be rotated thereby.

3. In a locking device, the combination of an elongated casing having a bore extending longitudinally and completely therethrough, a lock mounted in the bore adjacent one end of the casing, an element rotatably mounted in the bore adjacent the other end of the casing and provided with a screw-thread to receive a threaded part, said element having a notch formed in its inner end, bolt-means disposed in the bore between the element and the lock and slidable axially of said bore, for entering said notch to lock the casing and element so that the element may be rotated by rotation of the casing, and means controlled by the lock for withdrawing said bolt means from the notch to release the casing for independent rotation so that the element cannot be rotated thereby.

4. In a locking device, the combination of an elongated casing having a bore extending longitudinally and completely therethrough, a lock mounted in the bore adjacent one end of the casing, an element rotatably mounted in the bore adjacent the other end of the casing and provided with a screw-thread to receive a threaded part, said element having a notch formed in its inner end, bolt-means disposed in the bore between the element and the lock and slidably axially of said bore, for entering said notch to lock the casing and element so that the element may be rotated by rotation of the casing, and cam means controlled by the lock for withdrawing said bolt means from the notch to release the casing for independent rotation so that the element cannot be rotated thereby.

5. In a locking device, the combination of an elongated casing having a bore extending longitudinally and completely therethrough, a lock mounted in the bore adacent one end of the casing, an element rotatably mounted in the bore adjacent the other end of the casing and provided with a screw-thread to receive a threaded part, said element having a notch formed in its inner end, bolt-means disposed in the bore between the element and the lock and slidable axially of said bore, for entering said notch to lock the casing and element so that the element may be rotated by rotation of the casing, a spring between said element and lock for shifting the aforesaid means into the notch, and means controlled by the lock, for withdrawing said bolt means from the notch against the action of the spring to release the casing for independent rotation so that the element cannot be rotated thereby.

Signed at Chicago, Illinois, this 18th day of March, 1926.

EDWARD PAYSON BAIRD.